United States Patent Office 3,412,533
Patented Nov. 26, 1968

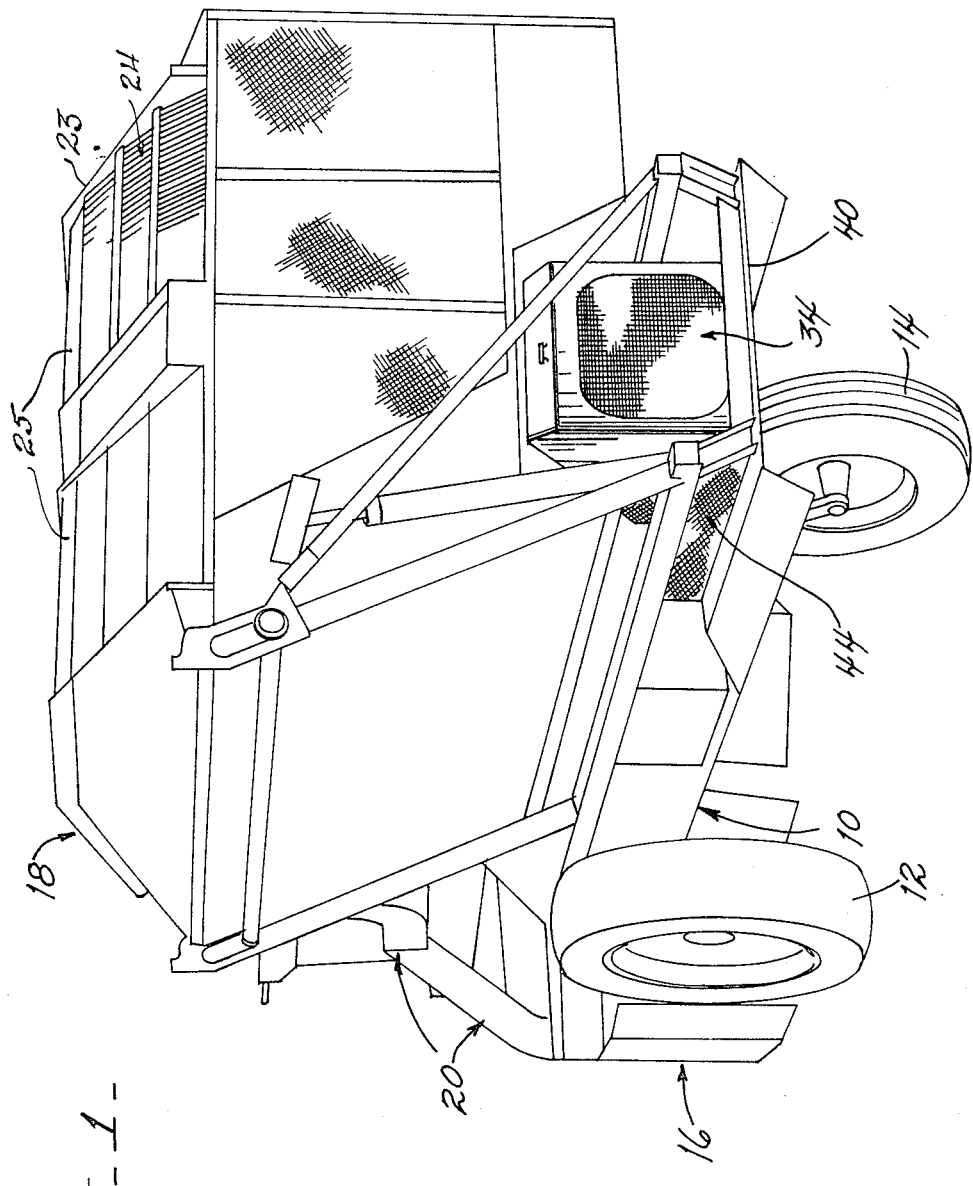

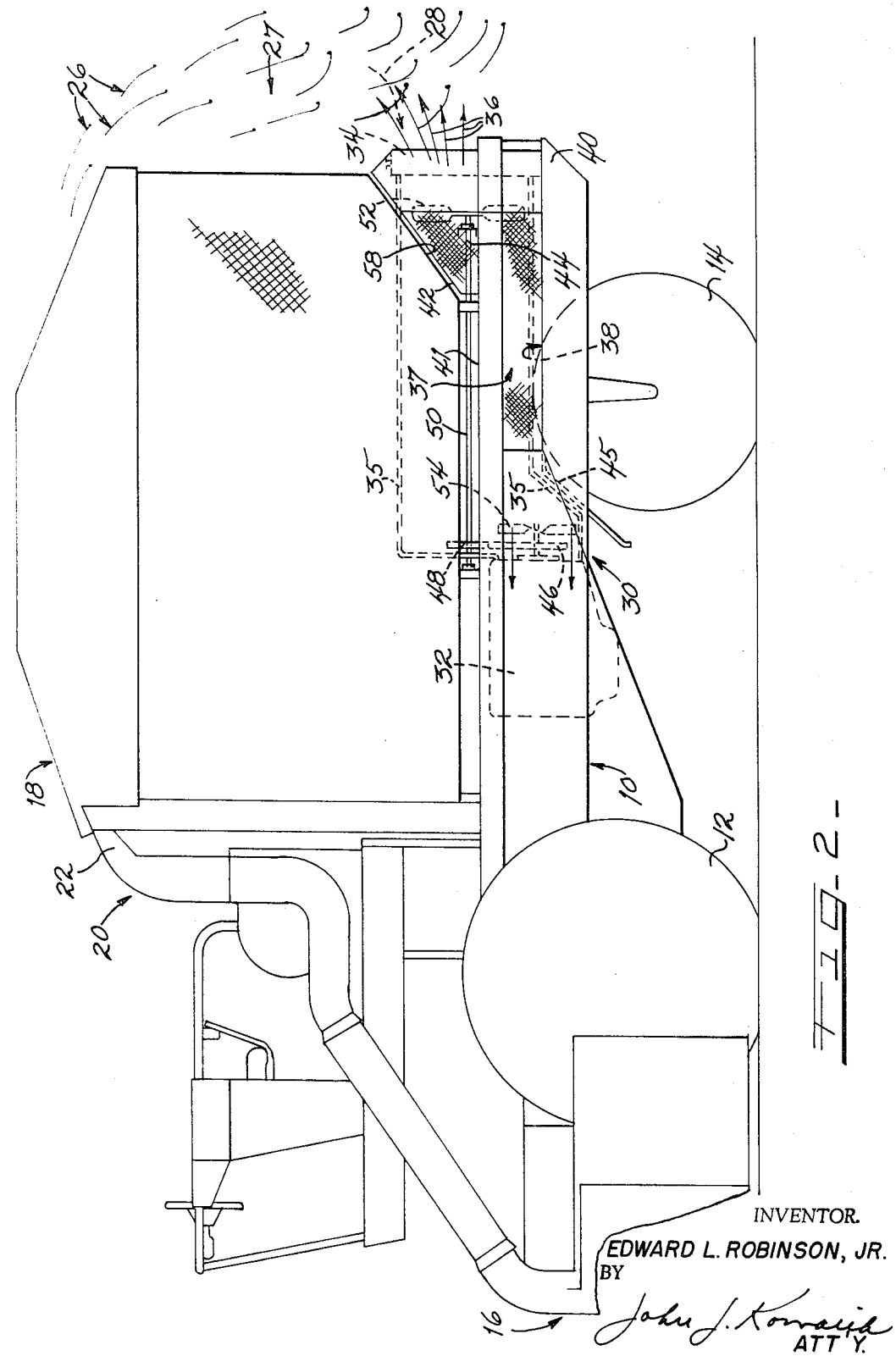

3,412,533
COTTON PICKER
Edward L. Robinson, Jr., Memphis, Tenn., assignor to International Harvester Company, Chicago, Ill., a corporation of Delaware
Filed Aug. 3, 1966, Ser. No. 570,060
9 Claims. (Cl. 56—12)

The present invention relates to a cotton picker and more particularly a cotton picker with means for controlling the trash developed in the picking operation, and preventing or minimizing the accumulation of trash in unwanted places such as in the power plant of the picker.

A cotton picker usually includes a power plant located under the storage basket, the power plant including a radiator, and because of the characteristic construction of the picker, the radiator is best located at the rear of the picker. The power plant includes the usual fan for impelling a stream of cooling air past the radiator, and in previous pickers such stream of air was drawn inwardly from the rear of the picker. There is more trash at this location than anywhere else in the vicinity of the picker, because the cotton on being picked is blown into the storage basket from the front and the trash is thrown out in rearward direction and it falls or cascades downwardly from the top of the basket over the rear end of the picker. The air when drawn inwardly from the rear over the radiator, as it was done heretofore, it derived from the region of most concentrated trash, with corresponding serious difficulties.

A broad object of the present invention is to provide in a cotton picker of the foregoing general character, means for impelling a stream of air past the radiator in rearward direction so as not to draw the trash from rearwardly of the picker past the radiator, the stream of air thus developed not only being relatively free of the trash, but it blows the trash at the rear away from the picker.

An additional, and more specific, object is to provide an arrangement of the character just referred to in which the air for producing the cooling stream is drawn generally from under the storage basket where the air is relatively clear of trash.

Another object is to provide a picker of the foregoing character which includes a novel design of construction and location of the components of the power plant so as to enable the storage to extend lower than heretofore and thus to lower the overall height of the picker.

An additional object is to provide a picker of the foregoing general character in which the different components of the power plant are in relatively separated and spaced positions, and including a novel arrangement for cooling the power plant by impelling an air stream past the radiator as referred to above, and for impelling an additional air stream over other components such as the manifold of the engine of the power plant.

Other objects and advantages of the invention will appear from the following detail description taken in conjunction with the accompanying drawings wherein FIGURE 1 is a perspective view taken generally from the rear of a picker embodying the features of the invention; and FIGURE 2 is a side elevational view of the picker.

Referring now in detail to the accompanying drawings the picker incorporates a number of main parts of a kind now in use. It includes a frame or chassis 10 supported by drive wheels 12 at the front and a single steering or dirigible wheel 14 at the rear. A pair of picker units 16 are provided at the front and a mesh or open-work storage basket 18 is mounted on the frame for receiving the picked cotton. Means indicated broadly at 20 is provided for conveying the picked cotton from the picker units 16 to the storage basket, blowing the cotton through laterally spaced outlet ends or nozzles 22 into the basket, from the front toward the rear. The conveying means is of presently known construction, as is the bottom portion or the basket. However, the backet includes a top 23 having a top grate 24 which is made up of a pair of separate and laterally spaced sections 25. The trash accompanying the cotton and blown into the basket is blown through the top grill 24 and it flies out mainly in rearward direction and falls or cascades downwardly rearwardly of the picker, as indicated at 26 in laterally spaced streams. These falling streams cover of course quite an area indicated generally at 27, but a goodly portion of the trash is still directly and immediately to the rear of the picker, and in pickers as heretofore made the air for cooling the radiator of the power plant usually was drawn forwardly from this area as indicated by the dotted line arrow 28.

A power plant of the general kind referred to is also utilized in the present instance and indicated generally at 30, including a water cooled engine 32 and a radiator 24 which, however in the present instance, are located at relatively spaced positions in fore-and-aft directions, and interconnected by water lines 35. The radiator is positioned higher than the engine, and located at or slightly beyond the rear of the picker, as it was in pickers heretofore known, and when the stream of cooling air was drawn inwardly as indicated by the dotted line arrow 28, it carried the trash from the region 27 toward the radiator, and to prevent it from being carried through the passages in the radiator, a trash screen over the radiator was heretofore necessary, the screen becoming filled and clogged periodically and it was required to be cleaned accordingly. In the present instance the radiator is positioned generally between the falling streams 26.

The present invention reverses the stream of cooling air past the radiator 34 in rearward direction as indicated by the solid line arrows 36. The cooling stream is initiated in the region generally under the basket where the surrounding air is relatively free of trash. The separation of the engine and radiator provides a space indicated generally at 37 accommodating the wheel 14, and in this space an air stream channel 38 is provided, bounded on the bottom by an imperforate shield or roof 40 covering the wheel 14. The channel is bounded on the top by imperforate elements 41 and 42 and at least on one side by screen members 44. The power plant is located generally to one side of the longitudinal center line and thus the air stream channel 38 is disposed closer to one side of the picker than the other. The screen members 44 are provided on such outer side of the channel, but the other side of the channel (not shown) may be bounded by an imperforate element. The lower imperforate element 40 protects the various parts from trash and mud from the wheel 14.

The engine 32 is located forwardly of the radiator at a position forwardly of the air stream channel 38 a sufficient distance to provide such a channel of required capacity for providing two air streams as referred to below. The engine includes a driving pulley 46 which through a belt 48 drives a shaft 50 which extends at its rear end into the channel 38 and has mounted on its rear end a fan 52 for blowing air through the radiator 34. Another fan 54 is driven by the engine, being mounted for example on the shaft supporting the pulley 46 and is located at the front of the air stream channel 38, blowing air from that channel forwardly over the engine and particularly over the manifold thereof, for cooling purposes. A shield 45 is provided at the bottom of the front of the air stream channel to protect the engine and other parts from trash and mud from the wheel.

The air drawn into the channel 38 through the screen members 44, is so drawn from an area generally under the basket, and therefore relatively free of trash and clogging of the spaces in the radiator 34 is thereby eliminated, and the necessity for a protective screen therefor is accordingly eliminated. This cooling stream being blown rearwardly into the region 27 not only eliminates blowing trash through the radiator, but blows the falling trash rearwardly or lifts it away from close proximity to the radiator. The cooling air after passing through the radiator is heated to a substantial degree and this hot air stream has an additional effect of drying the trash which has become at least partially moistened from the water supplied to the picking spindles, part of which at least finds its way into the trash. This hot air furthermore produces an upstream which aids in carrying the trash away from the immediate vicinity of the radiator.

The divided streams of trash 26 also provide an advantage in that the radiator 34 is positioned somewhat between those streams and the area immediately to the rear of the radiator is therefore freer of trash than to the sides thereof. The effect of the air stream 36 causes a generally uplifting and forcing rearwardly of the cascading streams of trash, maintaining a relatively free area next to the basket.

This stream 36 also has the added advantage of preventing recontamination of the cotton by the trash after the trash has been blown out of the basket in the first instance. Previously at least a portion of the trash in falling rearwardly of the basket would tend to be again drawn thereinto through the perforate side walls thereof by the forwardly drawn cooling stream. That tendency is overcome in the present instance by the blowing of the trash rearwardly away from the basket. Another advantage of the arrangement is the divided basket top in which the grate sections 25 provide a much greater area for escape of trash from within the basket. The arrangement enables a much lower air pressure in the conveying means 20 than heretofore for conveying the cotton into the basket but the greater area of the grate enables substantially greater escape of the trash through the grill for any given air pressure used and the lesser air pressure produces less turbulence of the air and hence more gradual or more regular fall of the streams of trash. Accordingly the outward flowing cooling air stream produces a greater effect in blowing the falling trash away from the basket.

The provision of the rearwardly moving cooling air stream enables the placement of the engine 32 in separated relation to the radiator, as mentioned above. The engine unit per se of the power plant may be of relatively compact dimensions, particularly in height and it can be located at a very low position relative to the frame 10, leaving the radiator 34 of greater height to provide the desired cooling capacity. The location of the radiator at the end of the picker enables the storage basket to extend downwardly a greater extent than heretofore possible, the air stream channel 38 being of shallow depth through most of its length and then merging into an enlarged portion at the rear as defined by the element 42. To accommodate this enlarged portion of the air stream channel the basket is reduced in size only at the lower rear corner as indicated at 58. The arrangement enables the storage basket to have greater capacity for any given height, or to have the same capacity but of lesser height and thus lowering the overall height of the picker.

While I have herein disclosed a preferred form of the invention it will be understood that changes may be made therein within the spirit and scope of the appended claims.

I claim:

1. In a cotton picker having picker units, a storage basket, and means for conveying picked cotton from the picker units to the basket and operative for producing an air stream blowing the cotton into the basket in a near side thereof which forces trash from the basket through the far side, the trash thereupon falling in a stream down past the far side, the improvement comprising, a power plant incorporated in the picker and positioned generally under the basket and including a component to be cooled also positioned at least adjacent the area under the basket, and the power plant also including means for developing a cooling air stream, drawing the air from a location generally under the basket and removed from said falling trash stream and blowing it over the component to be cooled in a direction generally outwardly from said location.

2. The invention set out in claim 1 wherein the air stream blows the cotton into the basket from the front thereof and forces trash from the rear thereof and the trash falls in a stream rearwardly of the picker, and wherein the component of the power plan to be cooled includes a radiator adjacent the rear of the picker, and the power plant blows the cooling air stream rearwardly through the radiator and into the stream of falling trash rearwardly of the picker.

3. The invention set out in claim 2 wherein the basket includes a major portion extending downwardly beyond the radiator and has a cut out space at the rear accommodating the radiator.

4. The invention set out in claim 1 wherein the conveying means is operative for blowing the cotton into the basket from the front thereof and forcing trash therefrom at the rear thereof, and wherein the component of the power plant to be cooled includes a radiator located at the rear of the picker, the basket includes a major portion extending downwardly beyond the radiator and has a cut out space at the rear accommodating the radiator, the power plant also includes an engine component spaced forwardly from said radiator with cooling lines interconnecting the engine and radiator, and the engine component is disposed lower than the radiator.

5. The invention set out in claim 1 wherein the conveying means blows the cotton into the basket at the forward end and forces trash from the basket at the rear end thereof, the component of the power plant to be cooled includes a radiator disposed at the rear of the picker extending above the bottom of the major portion of the basket, the basket at its rear end having a cut out portion accommodating the radiator, the power plant includes an engine adjacent the forward part of the basket under the main portion thereof, the picker also including an air stream channel enclosing the radiator and extending forwardly to the engine, said channel being open at its ends and having a screen opening at one side and otherwise being imperforate for confining and conducting air longitudinally therealong through its open ends, a fan in the air stream channel at the rear thereof and operative for forcing air from the channel rearwardly through the radiator, a shaft extending from adjacent the engine rearwardly and drivingly supporting said fan, means for driving the shaft from the engine, a second fan immediately rearwardly of the engine and operative upon operation thereof for blowing air from the channel forwardly over the engine, and means for driving the second fan from the engine.

6. In a cotton harvesting machine having a wheeled chassis, a water cooled engine mounted therein, a cotton harvester carried by the chassis and having a cotton receptacle mounted over the engine and having a trash discharge region behind the receptacle in a position to allow the trash to cascade behind the machine downwardly from the upper part of the receptacle, and means for cooling the engine disposed above the level of the engine and to the rear thereof and providing a steering wheel accommodation space between itself and the engine, said means including a radiator disposed rearwardly of the steering wheel accommodation space in substantial vertical alignment with said cascading stream, and fan means exhausting through the radiator and providing an air stream directed rearwardly of the machine in the path of the cascading stream for blowing the trash behind the machine away from the radiator.

7. The invention set out in claim 6 and including an air stream channel in said steering wheel accommodation space with screened intake openings generally under the basket.

8. The invention set out in claim 7 and including means forming a space extending forwardly from the air stream channel for conveying air from the channel forwardly over the engine, a shaft leading from adjacent the engine rearwardly and having driving connection with the fan means, means for rotating the shaft from the engine, a second fan in the channel for blowing air from the channel forwardly over the engine, and means for driving the second fan from the engine.

9. The invention according to claim 6 and pneumatic conveying means for carrying cotton and incidental trash from the harvester to the receptacle in a plurality of laterally spaced streams and blowing trash behind said receptacle, and said fan means located intermediate said laterally spaced streams.

References Cited

UNITED STATES PATENTS

| | | | |
|---|---|---|---|
| 2,674,075 | 4/1954 | Snow | 56—11 |
| 2,688,223 | 9/1954 | Hagen et al. | 56—11 |
| 2,741,888 | 4/1956 | Hamel et al. | 56—12 |
| 3,352,092 | 11/1967 | Hubbard | 56—12 |

RUSSELL R. KINSEY, *Primary Examiner.*